United States Patent
Liang et al.

(10) Patent No.: US 9,954,591 B2
(45) Date of Patent: Apr. 24, 2018

(54) BEAMFORMING IN A MU-MIMO WIRELESS COMMUNICATION SYSTEM

(71) Applicant: Ping Liang, Irvine, CA (US)

(72) Inventors: Ping Liang, Newport Coast, CA (US); Dengkui Zhu, Wanyuan (CN); Boyu Li, Irvine, CA (US)

(73) Assignee: RF DSP Inc., Irvine, CA (US)

( * ) Notice: Subject to any disclaimer, the term of this patent is extended or adjusted under 35 U.S.C. 154(b) by 0 days.

(21) Appl. No.: 15/537,821

(22) PCT Filed: Jan. 16, 2016

(86) PCT No.: PCT/US2016/013743
§ 371 (c)(1),
(2) Date: Jun. 19, 2017

(87) PCT Pub. No.: WO2016/115546
PCT Pub. Date: Jul. 21, 2016

(65) Prior Publication Data
US 2017/0373737 A1    Dec. 28, 2017

Related U.S. Application Data

(60) Provisional application No. 62/104,088, filed on Jan. 16, 2015.

(51) Int. Cl.
*H04B 7/06* (2006.01)
*H04B 7/0452* (2017.01)

(52) U.S. Cl.
CPC ......... *H04B 7/0617* (2013.01); *H04B 7/0452* (2013.01)

(58) Field of Classification Search
CPC .... H04B 7/0617; H04B 7/0452; H04B 7/022; H04B 7/0456; H04B 7/06; H04B 1/1018; H04L 5/14; H04L 5/0053; H04L 72/042; H04L 72/0413; H04W 16/32
See application file for complete search history.

(56) References Cited

U.S. PATENT DOCUMENTS

| | | | |
|---|---|---|---|
| 7,505,788 B1 | 3/2009 | Narasimhan | |
| 8,774,109 B2 * | 7/2014 | Kenington | H04W 88/085 370/329 |
| 9,210,674 B2 * | 12/2015 | Lin | H04W 56/001 |
| 9,642,023 B2 * | 5/2017 | Ling | H04W 24/02 |
| 9,806,926 B2 * | 10/2017 | Xu | H04L 27/2607 |
| 2011/0310881 A1 | 12/2011 | Kenington | |

(Continued)

FOREIGN PATENT DOCUMENTS

| | | |
|---|---|---|
| EP | 2648342 A1 | 10/2013 |
| WO | WO2014193475 A1 | 12/2014 |
| WO | WO2014209015 A1 | 12/2014 |

OTHER PUBLICATIONS

PCT/US2016/013743 International Preliminary Report on Patentability, WIPO, dated May 27, 2016.

*Primary Examiner* — Siu Lee
(74) *Attorney, Agent, or Firm* — Guosheng Wang; United States Research and Patent Firm

(57) ABSTRACT

This invention provides methods for Distributed Massive MIMO (DM-MIMO) that use one or more central Baseband Units (BBUs), one or more Multi-User Beamformers for each BBU performing multi-user MIMO computations, and a number of RRHs distributed over a geographic area.

10 Claims, 1 Drawing Sheet

(56) References Cited

U.S. PATENT DOCUMENTS

2013/0005382 A1    1/2013   Landstrom et al.
2013/0077554 A1    3/2013   Gauvreau et al.
2013/0287131 A1   10/2013   Hart et al.
2014/0031049 A1    1/2014   Sundaresan et al.
2014/0105056 A1    4/2014   Li et al.
2014/0269968 A1    9/2014   Li et al.

\* cited by examiner

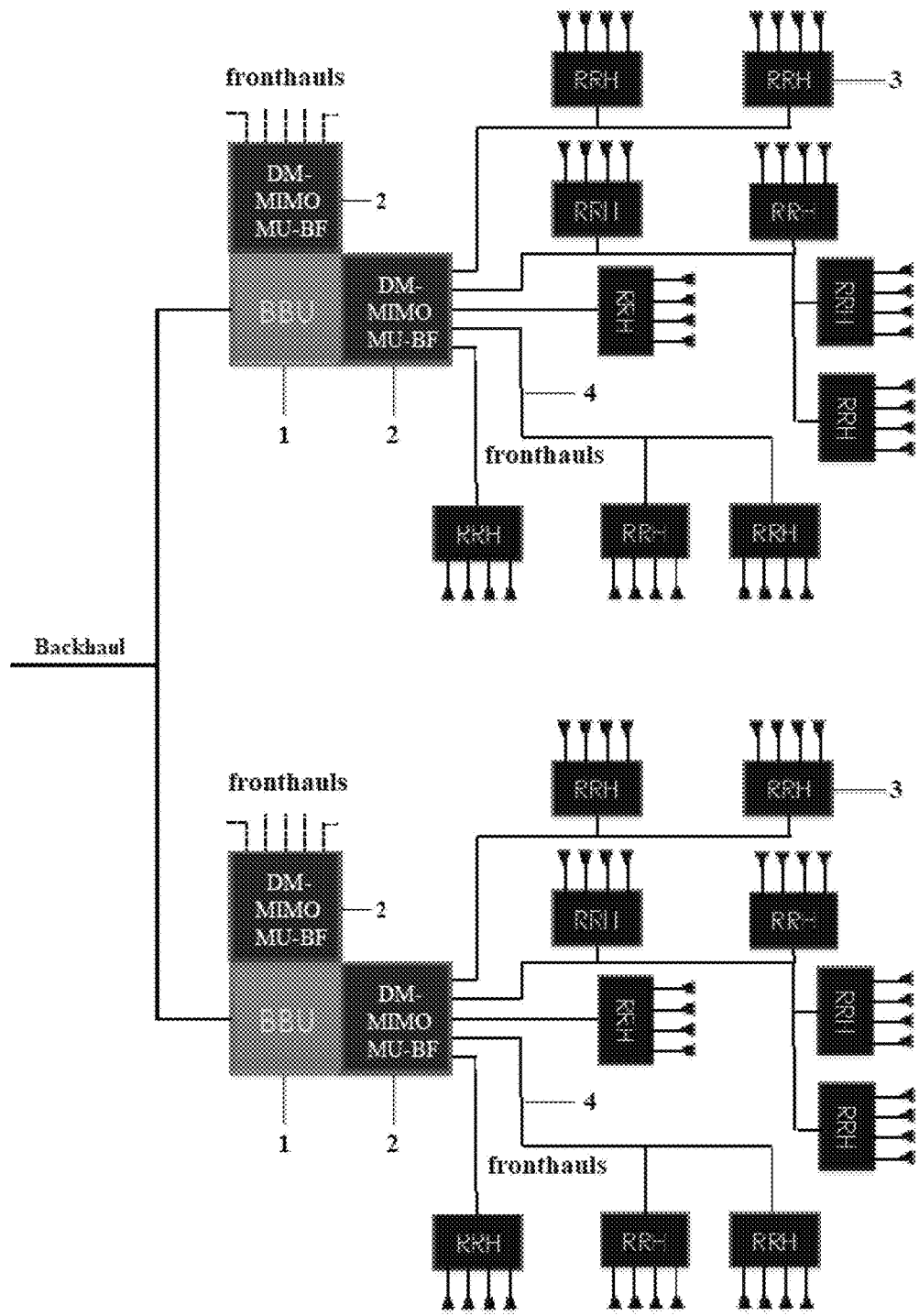

BEAMFORMING IN A MU-MIMO WIRELESS COMMUNICATION SYSTEM

This application claims the benefit of U.S. Provisional Application No. 62/104,088 filed on Jan. 16, 2015.

FIELD OF INVENTION

This invention relates to Multi-User Multiple-Input Multiple-Output (MU-MIMO) wireless communications, and more particularly, to beamforming in a MU-MIMO system.

BACKGROUND

To meet the continued fast growing demand of mobile data, the wireless industry needs solutions that can provide very high data rates in a coverage area to multiple users simultaneously including at cell edges at reasonable cost. Currently, the wireless telecom industry is focused on dense deployment of small cells, the so called ultra-dense networks, to increase spatial re-use of wireless spectrum as the solution for meeting the growing mobile data demand. Dense deployment of small cells requires a large number of backhauls and creates highly complex inter-cell interference. One solution to the interference problem is to require careful Radio Frequency (RF) measurement and planning and inter-cell coordination, which significantly increases the cost of deployment and reduces the spectral efficiency. Another solution is the Self-Organizing Network (SON) technology, which senses the RF environments, configures the small cells accordingly through interference and Tx management, coordinated transmission and handover. SON reduces the need for careful RF measurement and planning at the cost of increased management overhead and reduced spectral efficiency. The backhaul network to support a large number of small cells is expensive to be laid out.

Another method for increasing spatial re-use of wireless spectrum is MIMO, especially Multi-User MIMO (MU-MIMO). In a wireless communication system, a wireless node with multiple antennas, a Base Station (BS) or a User Equipment (UE), can use beamforming in downlink (DL) or uplink (UL) to increase the Signal-to-Noise Ratio (SNR) or Signal-to-Interference-plus-Noise Ratio (SINR), hence the data rate, of the links with other wireless nodes. MU-MIMO can beamform to multiple UEs simultaneously in a frequency and time block, e.g., a Resource Block (RB), i.e., using spatial multiplexing to provide capacity growth without the need of increasing the bandwidth. In a large-scale MIMO or massive MIMO system, a BS may be equipped with many tens to hundreds of antennas. In order for the BS to beamform to multiple UEs using the plural of antennas, the BS needs to know the DL channels to the UEs sufficiently accurately, e.g., the DL Channel State Information (CSI) of each UE. However, it is not efficient to obtain the DL CSI directly by sending reference pilots in the downlink because of two reasons: (1). The large number of antennas on the BS would cause large system overhead for reference signals in the downlink; (2). Dozens of bits are needed to quantize the CSI accurately, which causes overload of the feedback channel in the UL. Fortunately, the reciprocal property of an over the air wireless channel, such as in a Time-Division Duplexing (TDD) system or in a Frequency-Division Duplexing (FDD) system using switching to create channel reciprocity as described in our PCT application PCT/US14/71752 filed on Dec. 20, 2014, claiming the benefit of provisional patent application 61/919,032 filed on Dec. 20, 2013, can be employed to reduce the channel estimation overhead. In such a system, a UE sends a pilot signal, e.g., Sounding Reference Signal (SRS), which is received by all the antennas on the BS in the UL. The BS estimates the UL CSI through the received pilot signal and uses it to estimate the DL CSI based on channel reciprocity.

BRIEF DESCRIPTION OF DRAWINGS

FIG. 1 shows the structure of a Distributed Massive MIMO (DM-MIMO) system.

DETAILED DESCRIPTION

Reference may now be made to the drawings wherein like numerals refer to like parts throughout. Exemplary embodiments of the invention may now be described. The exemplary embodiments are provided to illustrate aspects of the invention and should not be construed as limiting the scope of the invention. When the exemplary embodiments are described with reference to block diagrams or flowcharts, each block may represent a method step or an apparatus element for performing the method step. Depending upon the implementation, the corresponding apparatus element may be configured in hardware, software, firmware or combinations thereof. Here after, a pilot signal may mean a signal transmitted by one antenna for the purpose of estimating the channel between the transmitting antenna and one or more receiving antennas. It may also be called a reference signal, a channel estimation signal or a test signal.

In the following descriptions, an antenna is used to indicate a RF path that includes the RF circuits and the antenna unless indicated by the context otherwise, for example, in a hybrid beamforming system, one RF path may be connected to multiple antenna elements via a beamforming circuit, mostly analog. In such a system, all the antenna elements connected to the same RF path can be treated as a single equivalent antenna in baseband processing.

One aspect of the invention provides a method for Distributed Massive MIMO (DM-MIMO) comprising:

using one or more central Baseband Units (BBUs), connected by a backhaul to a core network, to perform baseband signal processing;

one or more Multi-User Beamformers for each Baseband Unit performing multi-user MIMI) computations for antennas on all Remote Radio Heads (RRHs) connected to it or for antennas on one or more clusters of RRHs connected to it to achieve a high order of spatial multiplexing over the entire coverage area with low inter-beam interference;

a number of RRHs distributed over a geographic area transmitting and receiving wherein each RRH contains a plural of antennas, RF transceivers and a synchronization circuit and is connected to a Multi-User Beamformer via an optical fiber, cable or a wireless link fronthaul connection, and, a UE selection and scheduling module in a Multi-User Beamformer selecting and scheduling two or more RF disjoint subsets of RRHs and UEs covered by them and the Multi-User Beamformer performing MIMO beamforming computations for the two or more RF disjoint subsets independently and simultaneously using the same frequency resource, wherein the beamforming computations for each subset use a channel matrix that only includes the channels of the RRHs and UEs in the subset.

Another aspect of the invention provides a method for Distributed Massive MIMO (DM-MIMO) comprising:

using one or more central Baseband Units (BBUs), connected by a backhaul to a core network, to perform baseband signal processing;

one or more Multi-User Beamformers for each Baseband Unit performing multi-user MIMO computations for antennas on all Remote Radio Heads (RRHs) connected to it or for antennas on one or more clusters of RRHs connected to it to achieve a high order of spatial multiplexing over the entire coverage area with low inter-beam interference;

a number of RRHs distributed over a geographic area transmitting and receiving wherein each RRH contains a plural of antennas, RF transceivers and a synchronization circuit and is connected to a Multi-User Beamformer via an optical fiber, cable or a wireless link fronthaul connection carrying digital and/or analog signals; and, a central BBU broadcasting a master reference clock signal via the wired fronthaul connection or wirelessly to all RRHs, each of which recovers the master reference clock signal and uses it to generate the local clock and carrier signal to ensure all RRHs use the same carrier frequency.

One embodiment of this invention is a method for wireless network densification to provide higher throughput and higher spectrum efficiency than deploying dense small cells. The embodiment is referred to as Distributed Massive MIMO (DM-MIMO), as illustrated in FIG. 1, comprising of a central baseband unit (BBU) supported by a multi-user beamformer (MU-BFer) comprising a UE selection and scheduling module as well as a centralized backhaul, and a large number (many tens to hundreds) of Remote Radio Heads (RRHs), each of which contains antennas, RF transceivers and sync circuits. They can be placed in places where small cells are placed or planned, or in other locations in the coverage area. Each RRH can have multiple antennas and all RRHs can transmit and receive in the same frequency bands for true "Frequency Reuse 1" in the entire area covered by all the RRHs. A RRH can be added to wherever improved coverage is needed, without requiring RF planning. Each RRH is connected to the central BBU via a fronthaul connection, which can be via an optical fiber, electrical cable or a wireless link Either digital IQ samples or analog RF signals are carried over the fronthaul connections. In the case of sending digital IQ samples over a fronthaul connection, the central BBU sends a master reference clock signal via the fronthaul connection to all RRHs, each of which recovers the master reference clock signal and uses it to generate the local clock and carrier signal to ensure all RRHs use the same carrier frequency, referred to as frequency synchronization. In addition, the central BBU may also calibrate the time delay with each RRH and adjust it accordingly to ensure signals transmitted by all. RRHs are synchronized in time. In one embodiment, the accuracy of time synchronization is relaxed as long as the time synchronization error is within the systems cyclic prefix, and the difference in delays among the RRHs are captured in channel model and taken care of in digital baseband processing. This reduces the cost and complexity of time synchronization on multiple RRHs. In another embodiment, synchronization of carrier phases among the multiple RRHs is not required. Instead, the carrier phase of each RRH is locked to its recovered master reference clock, e.g., using a Phase Locked Loop (PLL) circuit, thus the phase differences among the RRHs are fixed and are included in the channel model. As a result, these phase differences are handled in digital baseband.

Multi-user beamforming (MU-BF) is performed by the MU-BFer, e.g., using Zero-Forcing (ZF), Regularized-ZF (RZF), Minimum Mean Square Error (MMSE), Dirty-Paper Coding (DPC) or Conjugate Beamforming (CB), for antennas on all RRHs or clusters of RRHs to achieve a high order of spatial multiplexing over the entire coverage area with low inter-beam interference. The same frequency resource or the whole spectrum allocated to the BS can be simultaneously beamed to many UEs. When antennas in a cluster of RRHs (which may contain one or more RRHs, as long as a sufficient number of antennas are contained in the cluster) are used to perform MU-BF, it is referred to as Distributed MU-BF (DMU-BF). In one embodiment of DMU-BF, channel estimation or MU-BF using the same frequency resources are performed simultaneously for clusters of RRHs that are sufficiently far apart (relative to the transmitting power and large-scale fading), without worrying about interferences among the UE pilot signals or beams of different clusters because of their spatial separation by deployment. This embodiment is highly scalable, meaning that a large number of RRHs can be added to the DM-MIMO system to deploy over a coverage area so that the DM-MIMO system can beamform the same frequency resource or the whole spectrum allocated to the BS simultaneously to a very large number of UEs, e.g., tens to hundreds of UEs.

Multiple BBUs and their associated DM-MIMO systems can be deployed adjacently to cover a wider area. A DM-MIMO system can use additional antennas in overlapping coverage areas to make the transmissions by its RRHs to be orthogonal to the channels to the UEs in a neighboring DM-MIMO system to reduce the interference to the UE in the neighboring DM-MIMO system. A DM-MIMO system can obtain estimations of channels to UEs in a neighboring DM-MIMO system by listening to the pilot or reference signals transmitted by the UEs, and use the channel estimates to compute a pre-coding matrix to make the transmissions by its RRHs to be orthogonal to the channels to the UEs in a neighboring DM-MIMO system. This embodiment requires the multiple BBUs and their associated DM-MIMO systems to be synchronized.

DM-MIMO requires high speed fronthauls if digital IQ samples are transmitted via the fronthauls. The data rate on such fronthauls typically will be significantly higher than the data rate of backhauls for small cells. Alternatively, the fronthauls can transmit analog signals using RF-over-Fiber (RFoF). The digital fronthauls between the RRHs and the BBU can use star or cascade connections, or a combination as illustrated in FIG. 1, which comprises of a central baseband unit (BBU) 1 supported by a multi-user beamformer (MU-BFer) 2 as well as a centralized backhaul, and a large number (many tens to hundreds) of Remote Radio Heads (RRHs) 3. Moreover, each RRH is connected to the central BBU via a fronthaul connection 4. In an indoor environment, the cost of laying out fronthauls may be similar to the cost of laying backhauls to densely deployed small cells and may be acceptable in some applications. However, there are outdoor and some indoor environments where the cost of laying fronthauls is too expensive or impractical. One embodiment of this invention uses high speed wireless links to provide the fronthauls to small cells, thus, avoid using extensive wired connections such as wired backhauls to densely deployed small cells or fiber fronthauls to a large number of distributed RRHs. The embodiment also uses a wirelessly broadcast master reference clock signal and each of the RRHs recovers the master reference clock signal from the wireless broadcast and uses it to generate the local clock and carrier signal to ensure all RRHs use the same carrier frequency, as well as delay and phase calibrated relative to the master reference clock signal.

The embodiment may further comprising deploying distributed RRHs with fronthauls to form a DM-MIMO network, perform the first-level beamforming for each RRH or each cluster of RRHs, then consider all antennas on each of such RRH or cluster of RRHs as a single antenna and perform a second-level beamforming among multiple of such RRHs or clusters of RRHs.

In another embodiment, a MU-MIMO BS with a large number of antennas at a centralized location is employed to provide spatial multiplexed multi-stream wireless backhaul to distributed RRHs, which form a DM-MIMO network. Beamforming of the DM-MIMO network can be done by a central MU-BFer by transmitting channel information and baseband samples over the spatial multiplexed multi-stream wireless backhaul.

In yet another embodiment, a subset of the distributed RRHs are used to perform MU-MIMO beamforming, i.e., a channel matrix that only includes the channels of the subset of RRHs and selected UEs are used in computing the precoding or detection matrix by the MU-BFer to beamform to the selected UEs. This is done independent of what the other RRHs are doing. When two or more subsets of RRHs are located in areas that have a high degree of RF separation, this is, the path loss of RF signals from RRHs, hence UEs, in one subset to another subset is large, e.g., –20 dB (referred to as RF disjoint subsets), the two or more subsets perform MU-MIMO beamforming independently and simultaneously using the same frequency resources. Furthermore, a group of RF disjoint subsets perform MU-MIMO beamforming independently and simultaneously using the same frequency resources at time slot 1, and another group of RF disjoint subsets perform MU-MIMO beamforming independently and simultaneously using the same frequency resources at time slot 2. The two groups may overlap, meaning that some RRHs may belong to more than one group. This is spatial and time division of DM-MIMO, alleviating the problem of pilot contamination in channel estimation and reduces the computational load for beamforming by reducing dimensions of the channel matrices.

In MU-MIMO beamforming, uncorrelated channels are strongly preferred as they lead to low condition numbers of the channel matrix and higher capacity. However, in an area with many nearby UEs, e.g., large crowds in stadiums, live events, etc., some MU-MIMO channels are highly correlated. One embodiment is a method of user grouping to improve MU-MIMO beamforming comprising calculating correlations of the channels of different UEs; selecting UEs with low channel correlation into a group; allocating frequency resources to the group of UEs; computing precoding and/or detection matrix using channel matrix of the UEs in the group on the allocated frequency resources; and perform MU-MIMO beamforming with UEs in the group on the allocated frequency resources. Furthermore, UEs that are to be served at the same time slot may be divided into two or more such groups, each of which is allocated a part of the available frequency resources.

In a MU-MIMO system, the delay spreads of channels with different UEs may differ significantly. A larger delay spread corresponds to a short coherence bandwidth, thus requires computation of precoding and/or detection matrix on a larger number of frequency resource blocks or subcarriers. If channels with shorter delay spreads and with larger delay spreads are mixed together in MU-MIMO beamforming, precoding and/or detection matrix must be computed on the finer resolution of frequency resource blocks or subcarriers demanded by the TCs with larger delay spreads. This wastes computation resources by performing unnecessary computations on smaller frequency resource blocks or group of subcarriers for channels that have larger coherence bandwidth, and/or reduces the number of UEs that can be simultaneously served on the same frequency resources due the size of the matrices that can be processed in the allowed time by the hardware. Channels with larger coherence bandwidth only need computation of precoding and/or detection matrix on a small number of frequency resource blocks. One embodiment is a method of user grouping for efficient MU-MIMO beamforming computation comprising estimating the delay spreads or coherence bandwidth of the channels of different UEs; selecting UEs with similar delay spreads or coherence bandwidth into a group; allocating frequency resources to the group of UEs; computing precoding and/or detection matrix using channel matrix of the UEs in the group on the allocated frequency resources; and perform MU-MIMO beamforming with UEs in the group on the allocated frequency resources. Furthermore, UEs that are to be served at the same time slot may be divided into two or more such groups, each of which is allocated a part of the available frequency resources.

User grouping and frequency allocation also need to consider other UE channel conditions, i.e., Channel Quality Information (CQI), Channel Estimation Error (CEE), and UE Speed Indication Information (SII), as described in the Provisional Patent Application entitled "Frequency Resource Allocation in MU-MIMO Systems", 61/968,647 filed on Mar. 21, 2014. One embodiment estimates the channel parameters, including but not limited to, correlations, delay spreads or coherence bandwidth, CQI, CEE and SII of the channels of different UEs; selecting those UEs into a group based on their channel parameters such that it improves system performance, including but not limited to, improved MU-MIMO beamforming, increased system throughput, reduced computational load, reduced power consumption; allocating frequency resources to the group of UEs; computing precoding and/or detection matrix using channel matrix of the UEs in the group on the allocated frequency resources; and perform MU-MIMO beamforming with UEs in the group on the allocated frequency resources. Furthermore, UEs that are to be served at the same time slot may be divided into two or more such groups, each of which is allocated a part of the available frequency resources.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

We claim:

1. A method for Distributed Massive MIMO (DM-MIMO) comprising:
   performing a baseband signal processing using one or more central Baseband Units (BBUs), connected by a backhaul to a core network;
   performing multi-user MIMO computations with one or more Multi-User Beamformers for each Baseband Unit for antennas on all Remote Radio Heads (RRHs) connected to it or for antennas on one or more clusters of RRHs connected to it to achieve a high order of spatial multiplexing over a coverage area with low inter-beam interference;

transmitting and receiving signals with a number of RRHs distributed over a geographic area, wherein each RRH contains a plural of antennas, RF transceivers and a synchronization circuit and is connected to a Multi User Beamformer via an optical fiber, cable or a wireless link fronthaul connection; and, selecting and scheduling two or more RF disjoint subsets of RRHs and UEs covered by them with a UE selection and scheduling module in a Multi-User Beamformer, and performing MIMO beamforming computations with the Multi-User Beamformer for the two or more RF disjoint subsets independently and simultaneously using a same frequency resource wherein the MIMO beamforming computation for each subset use a channel matrix that only includes the channels of the RRHs and UEs in the subset.

2. The method in claim 1, wherein the Multi-User Beamformer obtaining channel estimations for UEs covered by the two or more RF disjoint subsets of RRHs independently and simultaneously by receiving the same pilots signals or pilots signals on same frequency resource from the UEs in the two or more RF disjoint subsets of RRHs wherein interference caused by pilot signals from UEs in one subset on another subset is tolerable.

3. The method in claim 1, further comprising a first group of RF disjoint subsets of RRHs and UEs performing MU-MIMO beamforming independently and simultaneously using a first frequency resource, and a second group of RF disjoint subsets of RRHs and UEs performing MU-MIMO beamforming independently and simultaneously using a second frequency resource, wherein the two groups are spatially disjoint.

4. The method in claim 1, further comprising a spatial and time division of DM-MIMO mode with a first group of RF disjoint subsets of RRHs and UEs performing MU-MIMO beamforming independently and simultaneously using a first frequency resource at a first time slot, and a second group of RF disjoint subsets of RRHs and UEs performing MU-MIMO beamforming, independently and simultaneously using the same first frequency resource at a second time slot.

5. The method in claim 1, wherein a RRH and/or UE belong or belongs to more than one RF disjoint subset.

6. A method for Distributed Massive MIMO (DM-MIMO) comprising:

performing a baseband signal processing with one or more central Baseband Units (BBUs), connected by a backhaul to a core network;

performing multi-user MIMO computations with one or more Multi-User Beamformers for each Baseband Unit for antennas on all Remote Radio Heads (RRHs) connected to it or for antennas on one or more clusters of RRHs connected to it to achieve a high order of spatial multiplexing over a coverage area with low inter-beam interference;

transmitting and receiving signals with a number of RRHs distributed over a geographic area, wherein each RRH contains a plural of antennas, RF transceivers and a synchronization circuit and is connected to a Multi-User Beamformer via an optical fiber, cable or a wireless link fronthaul connection carrying digital and/or analog signals; and, broadcasting a master reference clock signal with a central BBU via a wired fronthaul connection or wirelessly to all RRHs, each of which recovers the master reference clock signal and uses it to generate a local clock and carrier signal to ensure all RRHs use the same carrier frequency.

7. The method in claim 6, further comprising calibrating a delay and phase relative to the master reference clock signal.

8. The method in claim 6, further comprising the central BBU calibrating a time delay with each RRH and adjust it accordingly to ensure signals transmitted by all RRHs are synchronized in time.

9. The method in claim 8, further comprising relaxing an accuracy of time synchronization, capturing a difference in delays among the RRHs in channel models and accounting for their effects in digital baseband, processing.

10. The method in claim 6, further comprising locking carrier phase of each RRH to its recovered master reference clock, including phase differences among the RRHs in channel model and accounting for these phase differences in digital baseband.

* * * * *